United States Patent [19]

Kimura

[11] Patent Number: 6,091,515
[45] Date of Patent: *Jul. 18, 2000

[54] IMAGE FORMING SYSTEM INCLUDING AN IMAGE FORMING APPARATUS HAVING AN ENERGY SAVING MODE CONTROLLABLE BY AN EXTERNAL DEVICE

[75] Inventor: Munenori Kimura, Kanagawa, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,926

[22] Filed: Aug. 6, 1997

[30] Foreign Application Priority Data

Aug. 10, 1996 [JP] Japan .................................. 8-227540

[51] Int. Cl.[7] .................................................. H04N 1/00
[52] U.S. Cl. .......................................................... 358/434
[58] Field of Search ............................ 395/113; 358/442, 358/468, 434

[56] References Cited

U.S. PATENT DOCUMENTS

| 5,239,627 | 8/1993 | Beck et al. | 710/72 |
|---|---|---|---|
| 5,247,623 | 9/1993 | Sun | 710/106 |
| 5,438,436 | 8/1995 | Harris | 358/500 |
| 5,525,346 | 6/1996 | Kim et al. | 399/33 |
| 5,758,049 | 5/1998 | Lee | 395/750.05 |
| 5,803,623 | 9/1998 | Iwasaki | 400/54 |
| 5,832,190 | 11/1998 | Terajima et al. | 395/113 |

*Primary Examiner*—Amelia Au
*Assistant Examiner*—F. E. Cooperrider
*Attorney, Agent, or Firm*—Cooper & Dunham LLP

[57] ABSTRACT

An image forming system in which an energy saving mode can be canceled by an external device when the external device requests a printing operation to an image forming apparatus which is set in the energy saving mode. The external device outputs image data to be printed. Power consumption of the image forming apparatus is reduced when the image forming apparatus is waiting to receive the image data. A communication line connects the external device to the image forming apparatus. An energy saving control unit, provided in the image forming apparatus, recognizes a print request sent from the external device via the communication line when the image forming apparatus is set in the energy saving mode so that the energy saving mode is canceled when the print request is recognized. The print request can be either a strobe signal or a wakeup command. A ready command may be sent to the external device when the image forming apparatus is set in a stable state.

13 Claims, 4 Drawing Sheets

IMAGE FORMING SYSTEM INCLUDING AN IMAGE FORMING APPARATUS HAVING AN ENERGY SAVING MODE CONTROLLABLE BY AN EXTERNAL DEVICE

BACKGROUND OF THE INVENTION

1. Field of the Invention

The present invention generally relates to an image forming system and, more particularly, to an image forming system including an image forming apparatus for printing image data and an image data outputting apparatus, such as a word processor or a computer, for sending the image data to the image forming apparatus.

2. Description of the Related Art

Recently, energy efficiency and energy saving equipment has become a requirement for almost all office products, and many different types of office equipment having an energy saving function have been developed. For example, a facsimile apparatus having an energy saving function is now on the market. This apparatus reduces power consumption by deactivating a high-power consuming unit, such as a heater used in a printing unit, during a reception waiting mode.

In the conventional facsimile apparatus having such an energy saving function, when the facsimile apparatus is set in the energy saving mode, the energy saving mode is canceled by a manual operation of an operator inputting an instruction through an operational panel of the facsimile apparatus so as to turn on power of each part of the facsimile apparatus.

In the above-mentioned conventional facsimile apparatus, since the cancellation of the energy saving mode must be made by a manual operation, it is inconvenient for the operator to use such an energy saving mode.

In order to eliminate such inconvenience, Japanese Laid-Open Patent Application No. 5-95463 discloses a facsimile apparatus which cancels the energy saving mode by automatically turning on power when a calling signal transmitted through a telephone line is detected.

In the facsimile apparatus disclosed in the above-mentioned patent document, since the cancellation of the energy saving mode is performed by detecting the calling signal, the cancellation can be achieved only when the facsimile apparatus is called by a remote facsimile apparatus.

Recently, many functions are provided to facsimile apparatuses, and printing units provided in facsimile apparatus es are provided with a communication function. The communication function provided to the printing unit allows the facsimile apparatus to be used as a printer by an external device. That is, the facsimile apparatus is connected to an external device such as a word processor or a personal computer so that the facsimile apparatus is used as a printer for the external device.

In such circumstances, the above-mentioned conventional facsimile apparatus cannot provide appropriate energy saving performance since the cancellation of the energy saving mode is performed by a manual operation or detection of a calling signal. More specifically, when the facsimile machine is connected to a word processor or a personal computer as to be used as a printer, the cancellation of the energy saving mode in the conventional facsimile apparatus cannot be performed automatically since the word processor or the personal computer does not generate and output a calling signal. Thus, there is a problem in that the conventional facsimile machines having the energy saving mode are inconvenient to use as a printer for an external device.

Additionally, in a facsimile apparatus or a printer, since only a high power consuming unit such as a printing unit is deactivated in the energy saving mode, further reduction in power consumption is desired.

SUMMARY OF THE INVENTION

It is a general object of the present invention to provide an improved and useful image forming system in which the above-mentioned problems are eliminated.

A more specific object of the present invention is to provide an image forming system in which an energy saving mode can be canceled by an external device when the external device requests a printing operation to an image forming apparatus which is set in the energy saving mode.

In order to achieve the above-mentioned objects, there is provided according to one aspect of the present invention an image forming system comprising:

an image data outputting apparatus outputting image data to be printed;

an image forming apparatus receiving the image data to print the image data on a recording sheet, the image forming apparatus having an energy saving mode in which power consumption of the image forming apparatus is reduced when the image forming apparatus is waiting to receive the image data; and a communication line connecting the image data outputting apparatus to the image forming apparatus, wherein the image forming apparatus includes an energy saving control unit which recognizes a print request sent from the image data outputting apparatus via the communication line when the image forming apparatus is set in the energy saving mode so that the energy saving mode is canceled when the print request is recognized.

According to the above-mentioned invention, the energy saving mode can be canceled by the print request sent from the external device via the communication line. Thus, the image forming apparatus can be set in a regular operation mode so that the image data sent from the external device is printed by the image forming apparatus even when the image forming apparatus is in the energy saving mode. Accordingly, the image forming system according to the present invention reduces power consumption while improving the utility of the image forming apparatus as a printing means.

In one embodiment according to the present invention, each part of the facsimile apparatus other than the energy saving control unit may be deactivated when the image forming apparatus is set in the energy saving mode Additionally, the image forming apparatus is activated when the energy saving control unit recognizes the print request, and the image forming apparatus announces to the image data outputting apparatus that the image forming apparatus is prepared to receive the print data when the image forming apparatus is set in a predetermined stable state after the image forming apparatus is activated.

There is provided according to another aspect of the present invention an image forming system comprising:

an image data outputting apparatus outputting image data to be printed;

an image forming apparatus receiving the image data to print the image data on a recording sheet, the image forming apparatus having an energy saving mode in which power consumption of the image forming apparatus is reduced when the image forming apparatus is waiting to receive the image data; and a communication line connecting the image data outputting apparatus to the image forming apparatus, wherein the image forming apparatus includes an energy saving control unit which recognizes a print request sent from the image data outputting apparatus via the communication line when the image forming apparatus is set in the energy saving mode so that the energy saving mode is canceled when the print request is recognized, and wherein the image data outputting apparatus sends to the image forming apparatus a strobe signal and dummy data prior to sending the print data, and the energy saving control unit recognizes the strobe signal as the print request.

According to the above-mentioned invention, the energy saving mode can be canceled by the strobe signal, which serves as the print request, sent from the external device via the communication line. Thus, the image forming apparatus can be set in a regular operation mode so that the image data sent from the external device is printed by the image forming apparatus even when the image forming apparatus is in the energy saving mode. Accordingly, the image forming system according to the present invention reduces power consumption while improving the utility of the image forming apparatus as a printing means. Additionally, since the strobe signal sent from the external device serves as the print request, the detecting operation of the print request is performed by a data decoder having a simple structure.

In one embodiment of the present invention, each part of the image forming apparatus other than the energy saving control unit may be deactivated when the image forming apparatus is set in the energy saving mode.

Additionally, the image forming apparatus may output a busy signal to the image data outputting apparatus when the energy saving control unit recognizes the print request, the busy signal indicating that the image forming apparatus is set in the energy saving mode, and the image forming apparatus is activated when the energy saving control unit recognizes the print request.

Further, the image forming apparatus stops to output the busy signal when the image forming apparatus is set in a predetermined stable state after the image forming apparatus is activated.

Additionally, there is provided according to another aspect of the present invention an image forming system comprising:

an image data outputting apparatus outputting image data to be printed;

an image forming apparatus receiving the image data to print the image data on a recording sheet, the image forming apparatus having an energy saving mode in which power consumption of the image forming apparatus is reduced when the image forming apparatus is waiting to receive the image data; and a bidirectional interface connecting the image data outputting apparatus to the image forming apparatus, wherein the image forming apparatus includes an energy saving control unit which recognizes a print request sent from the image data outputting apparatus via the bidirectional interface when the image forming apparatus is set in the energy saving mode so that the energy saving mode is canceled when the print request is recognized, and wherein the image data outputting apparatus sends a wakeup command to the image forming apparatus prior to sending the print data, and the energy saving control unit recognizes the wakeup command as the print request.

According to the above-mentioned invention, the energy saving mode can be canceled by the wakeup command, which serves as the print request, sent from the image data outputting apparatus via the bidirectional interface. Thus, the image forming apparatus can be set in a regular operation mode so that the image data sent from the image data outputting apparatus is printed by the image forming apparatus even when the image forming apparatus is in the energy saving mode. Accordingly, the image forming system according to the present invention reduces power consumption while improving the utility of the image forming apparatus as a printing means. Additionally, since the image forming apparatus recognizes the wakeup command as the print request, the print request is positively sent from the image data outputting apparatus to the image forming apparatus.

In one embodiment of the present invention, each part of the image forming apparatus other than the energy saving control unit may be deactivated when the image forming apparatus is set in the energy saving mode.

Additionally, the image forming apparatus may be activated when the energy saving control unit recognizes the print request, and the image forming apparatus sends to the image data outputting unit a ready command which indicates that the image forming apparatus is prepared for receiving the print data when the image forming apparatus is set in a predetermined stable state after the image forming apparatus is activated.

Further, the image forming apparatus may output data indicating that the image forming apparatus is set in the energy saving mode until the image forming apparatus is set in a predetermined stable state after the energy saving control unit recognizes the print request.

Additionally, there is provided according to another aspect of the present invention an image forming system comprising:

an image data outputting apparatus outputting image data to be printed;

an image forming apparatus receiving the image data to print the image data on a recording sheet, the image forming apparatus having an energy saving mode in which power consumption of the image forming apparatus is reduced when the image forming apparatus is waiting for reception of the image data; and a bidirectional interface connecting the image data outputting apparatus to the image forming apparatus, wherein the image forming apparatus includes an energy saving control unit which recognizes a print request sent from the image data outputting apparatus via the communication line when the image forming apparatus is set in the energy saving mode so that the energy saving mode is canceled when the print request is recognized, and wherein the image data outputting apparatus sends a wakeup command to the image forming apparatus prior to sending the print data, and the energy saving control unit recognizes a strobe signal as the print data, the strobe signal being sent from the image data outputting apparatus together with the wakeup command, and wherein the image forming apparatus is activated when the energy saving control unit recognizes the wakeup command, and the image forming apparatus sends to the image data outputting unit a ready command which indicates that the image forming apparatus is prepared to receive the print data when the image forming apparatus is set in a predetermined stable state after the image forming apparatus is activated.

According to the above-mentioned invention, the energy saving mode can be canceled by the strobe signal, which is sent together with the wakeup command and serves as the print request, sent from the image data outputting apparatus via the bidirectional interface. Thus, the image forming apparatus can be set in a regular operation mode so that the image data sent from the image data outputting apparatus is printed by the image forming apparatus even when the image forming apparatus is in the energy saving mode. Accordingly, the image forming system according to the present invention reduces power consumption while improving the utility of the image forming apparatus as a printing means. Additionally, since the strobe signal sent from the external device serves as the print request, the detecting operation of the print request is performed by a data decoder having a simple structure. Further, since the ready command is sent to the image data outputting apparatus when the image forming apparatus is set in the stable state, the fact that the image forming apparatus is prepared for receiving the image data is positively announce to the image data outputting apparatus.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to FIGS. 1 to 4, of an image forming system according to an embodiment of the present invention. The image forming system according to the embodiment of the present invention includes a facsimile apparatus 1 which is used as a printer.

Figure 1:
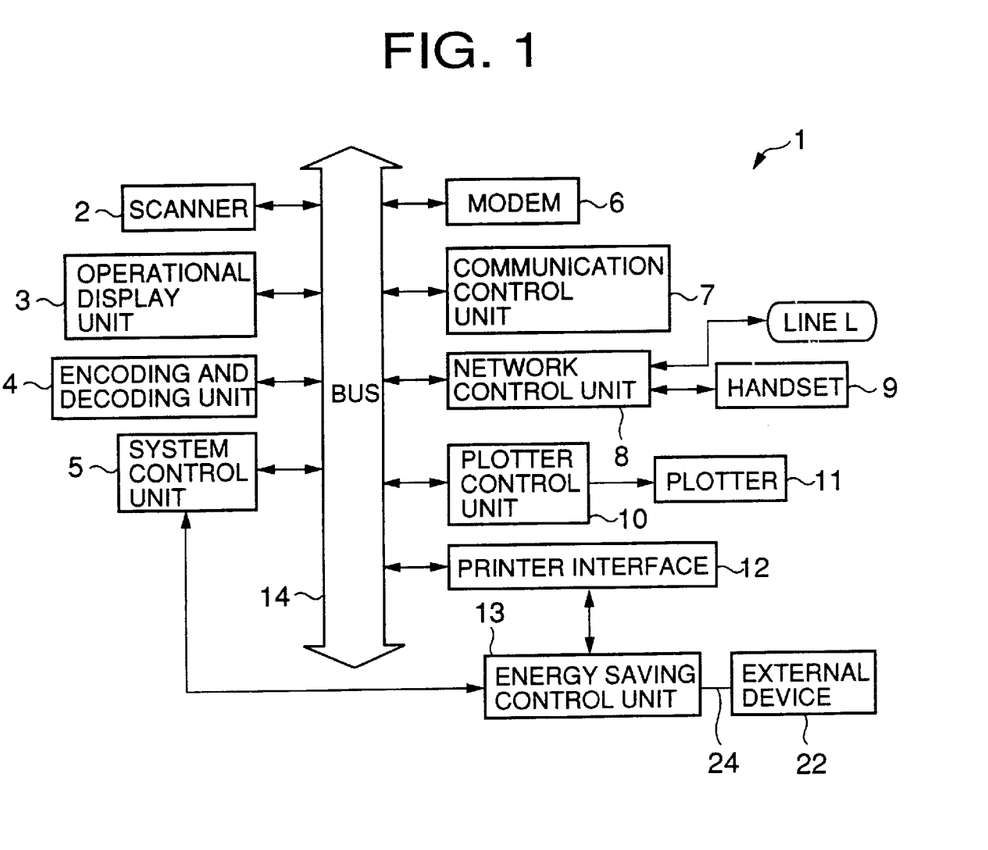
FIG. 1 is a block diagram of an image forming system according to an embodiment of the present invention.

FIG. 1 is a block diagram of the image forming system according to the present embodiment. As shown in FIG. 1, the facsimile apparatus 1 comprises a scanner 2, an operational display unit 3, an encoding and decoding unit 4, a system control unit 5, a modem 6, a communication control unit 7, a network control unit 8, a handset 9, a plotter control unit 10, a plotter 11, a printer interface 12 and an energy saving control unit 13. The scanner 2, the operational display unit 3, the encoding and decoding unit 4, the system control unit 5, the modem 6, the communication control unit 7, the network control unit 8, the printer control unit 10 and the printer interface 12 are connected to a bus 14. The image forming system shown in FIG. 1 also includes an external device 22 such as a word processor or a personal computer. The external device 22 is connected to the energy saving control unit 13 of the facsimile apparatus 1 via a communication line 24. In the present embodiment, the facsimile apparatus 1 serves as an image forming apparatus, and the external device 22 serves as an image data outputting apparatus which is connected to the image forming apparatus via the communication line 24.

The scanner 2 is an image scanner using a charge coupled device (CCD). The scanner 2 is provided with an automatic document feeder (ADF) so that a plurality of pieces of original document are set to the ADF. The ADF feeds the original document to a scanning position in the scanner 2 on a single piece basis. The scanner 2 scans the original document fed by the ADF with a predetermined resolution.

The operational display unit 3 includes various operational keys such as ten-keys and a start key. Particularly, an energy save cancellation key is included among the operational keys. The operational display unit 3 also includes a display such as a liquid crystal display. Various types of instructions are input through the operational keys. Various information and messages are displayed on the display in accordance with instructions input through the operational keys and information to be sent from the facsimile apparatus to the operator.

The encoding and decoding unit 4 is provided for increasing efficiency for storing image data in an image data memory, and for reducing a transmitting time of the image data. The encoding and decoding unit 4 encodes image data in accordance with a predetermined encoding method, and decodes encoded image data in accordance with a predetermined decoding method.

The system control unit 5 includes a central processing unit (CPU), a read only memory (ROM) and a random access memory (RAM). The ROM stores basic programs for performing an operation of the facsimile and programs for performing an energy saving control process. The system control unit 5 controls each part of the facsimile apparatus 1 in accordance with the programs stored in the ROM so as to execute a sequence of the facsimile apparatus 1. The system control unit 5 also execute an energy saving control process mentioned below. Specifically, the system controller 5 sets an energy saving mode to the facsimile apparatus 1 so as to deactivate each part of the facsimile apparatus 1 other than the energy saving control unit 13. The energy saving mode is set when the facsimile apparatus 1 is in a predetermined waiting state such as a waiting state for reception of data. Additionally, the system controller cancels the energy saving mode based on a signal input from the energy saving control unit 13 or the operational display unit 3 so as to activate each part of the facsimile apparatus 1.

The modem 6 operates under the control of the system control unit 5 so as to modulate signals to be transmitted and demodulate received signals. The communication control unit 7 exchanges facsimile control signals with a remote facsimile apparatus so as to execute facsimile communication procedures.

The network control unit 8 is connected to the handset 9 and a line L such as a public telephone line. The network control unit 8 switches between the handset 9 and the line L so as to allow communication through the handset 9 and automatically sends and receives a call through the line L.

The plotter control unit 10 controls an operation of the plotter 11 under the control of the system control unit 5. Particularly, the plotter control unit 10 selects and generates control signals for facsimile data and data from the external device.

The plotter 11 which corresponds to a printing means is constituted by an electronic photography recording apparatus. The plotter 11 records the image data scanned by the scanner 2 or image data received from a remote facsimile apparatus with a predetermined resolution. Additionally, the plotter 11 serves as a printer so as to record data transmitted from the external device 22 via the communication line 24, the data being transmitted in accordance with centronics interface signals.

The printer interface 12 receives a print signal from the external device 22 via the communication line 24 and the energy saving control unit 13. The printer interface 12 sends a signal representing an operational state of the facsimile apparatus 1. Additionally, the printer interface 12 converts the print signal from the external device 22 into image data in cooperation with the system control unit 5. As for the printer interface 12, a bidirectional centronics may be used.

Figure 2:
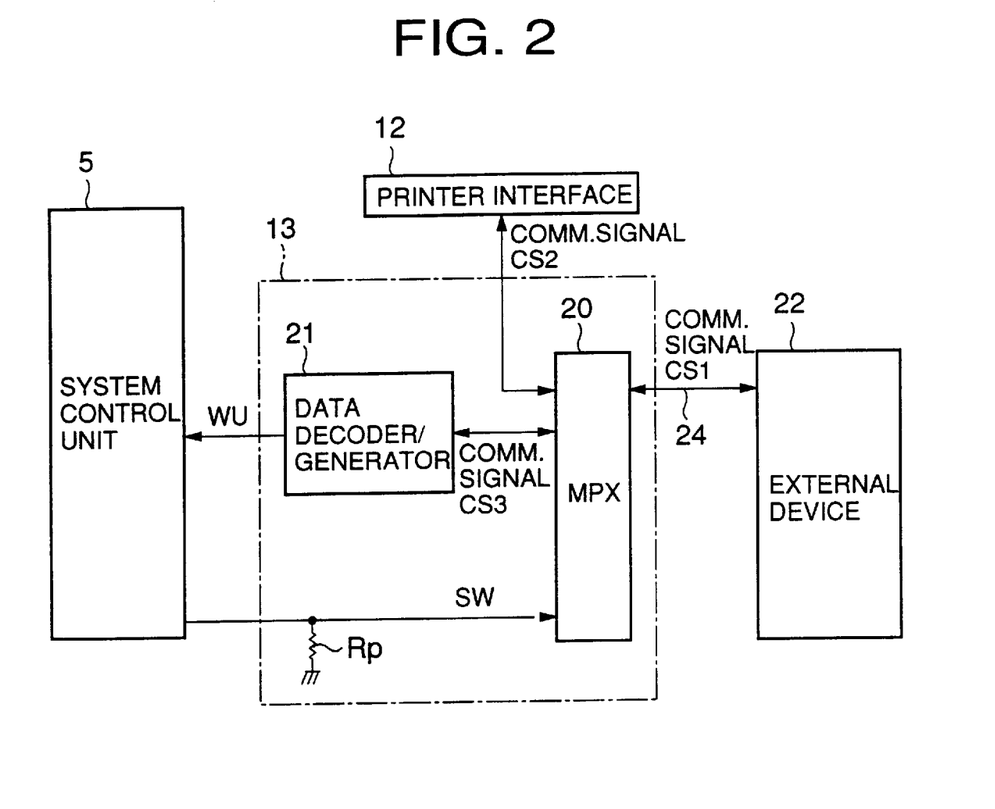
FIG. 2 is a block diagram of an energy saving control unit shown in FIG. 1.

The energy saving control unit 13 comprises, as shown in FIG. 2, a multiplexer (MPX) 20, a data decoder/generator 21 and a pull-down resistor Rp. The multiplexer 20 is connected to the external device 22 such as a word processor or a personal computer via the communication line 24 which meets the centronics standard. The energy saving control unit 13 interacts with the system control unit 5 and the external device 22 so that signals are exchanged between the system control unit 5 and the external device 22.

The multiplexer 20 of the energy saving control unit 13 receives a communication signal CS1 from the external device 22 via the communication line 24. The communication signal CS1 includes various control signals such as a strobe signal STB or a wakeup command and communication signals such as print data. The multiplexer 20 selectively sends the received communication signal CS1 to the printer interface 12 and the data decoder/generator 21 as a communication signal CS2 and a communication signal CS3, respectively. The data decoder/generator 21 distinguishes the strobe signal STB or the wakeup command from the communication signal CS3, and when the facsimile apparatus 1 is in an energy saving mode, the data decoder/generator 21 outputs to the multiplexer 20 a busy signal BUSY or announcement data, which indicates that the facsimile apparatus 1 is in the energy saving mode, as the communication signal CS3. At the same time, the data decoder/generator 21 generates and sends a wakeup signal WU to the system control unit 5 so as to cancel the energy saving mode to activate or turn on each part of the facsimile apparatus 1.

The system control unit 5 outputs a switch signal SW to the multiplexer 20. The switch signal SW is at a high level (H) when the energy saving mode is not set, that is, when the facsimile apparatus is in a regular operation mode, and is at a low level (L) due to the pull-down resistor Rp when the energy saving mode is set. The multiplexer 20 switches the signal path of the external device 20 to one of the printer interface 12 and the data decoder/generator 21 in accordance with the state of the switch signal SW being at the high level or the low level, that is, whether the facsimile apparatus 1 is set in the regular operation mode or the energy saving mode. Accordingly, the external device 22 is connected to the printer interface 12 when the facsimile apparatus 1 is set in the regular operation mode, and is connected to the data decoder/generator 21 when the facsimile apparatus 1 is set in the energy saving mode.

As mentioned above, the facsimile apparatus 1 is connected to the external device 20 via the communication line 24 so that the plotter 11 of the facsimile apparatus 1 can be used as a printer for the external device 22. The facsimile apparatus 1 can deactivate or turn off parts other than the energy saving control unit 13 when the facsimile apparatus 1 is in a predetermined state such as waiting for reception of data. When a request for printing is made by the external device 22 in the form of the strobe signal STB or the wakeup command, each part of the facsimile apparatus 1 is activated or turned on. When the facsimile apparatus 1 is set in a stable state after each part is activated or turned on, a signal indicating that the facsimile apparatus is in the stable state is announced to the external device 22.

Figure 3:
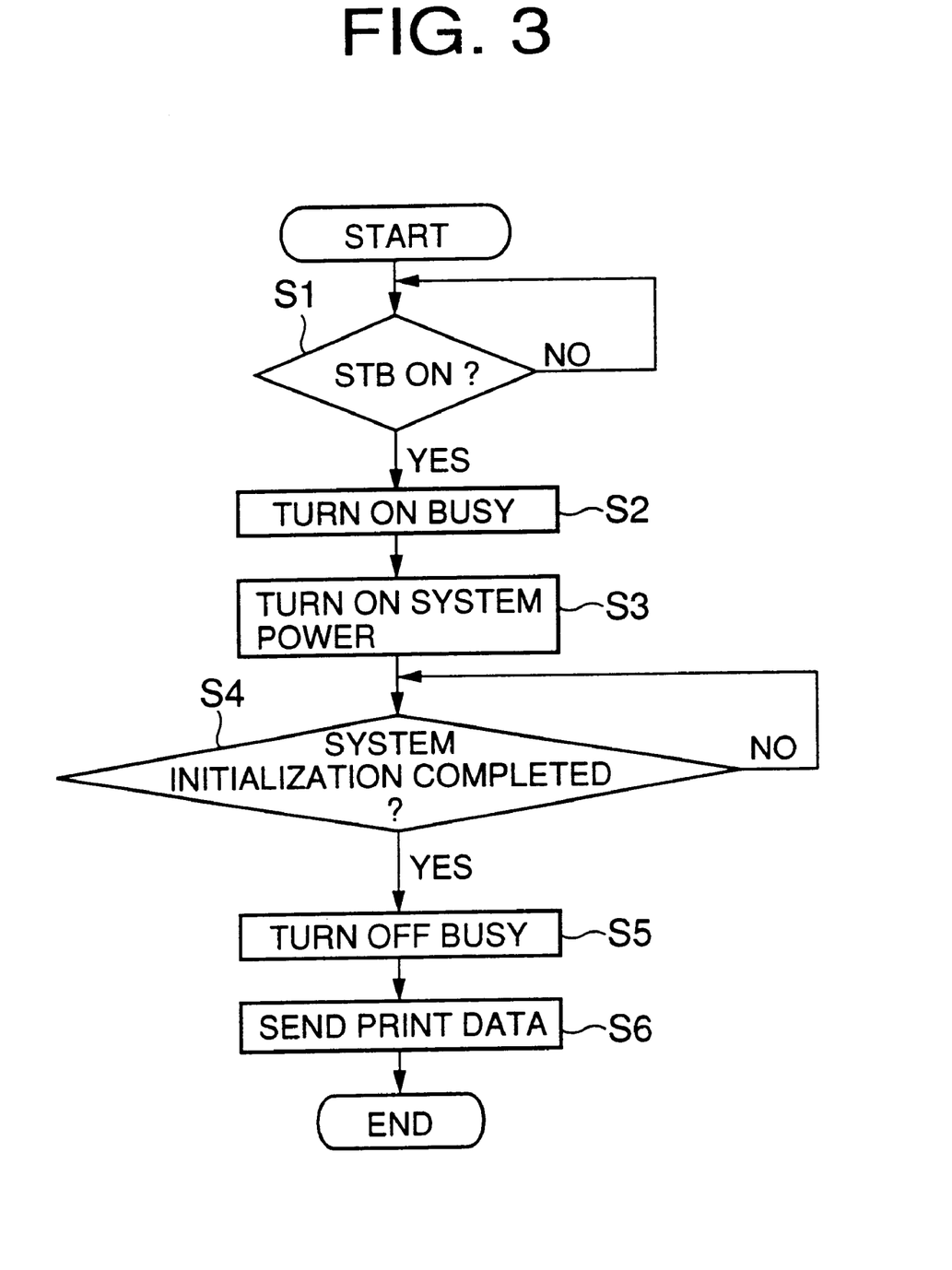
FIG. 3 is a flowchart of a print request accepting process based on a strobe signal.
Figure 4:
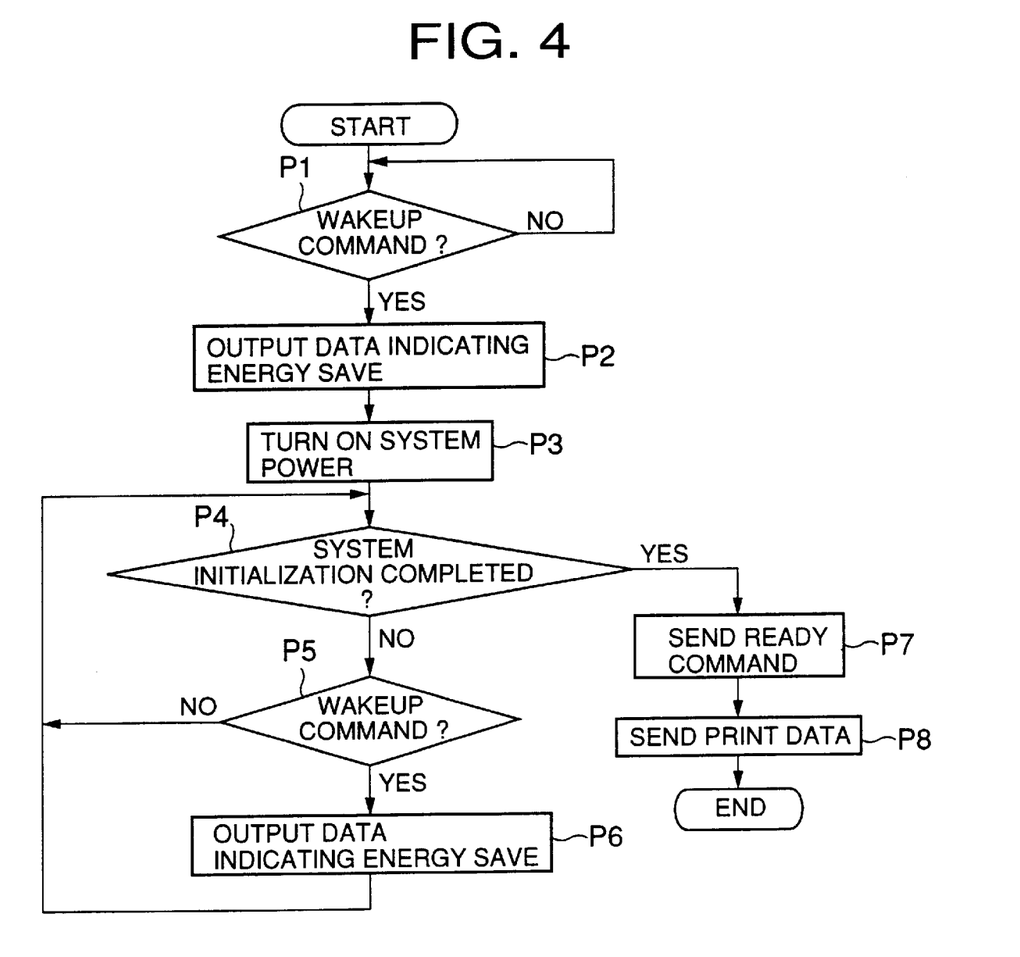
FIG. 4 is a flowchart of a print request accepting process based on a wakeup command.

A description will now be given, with reference to FIGS. 3 and 4, of the energy saving control process. A description will be given first, with reference to FIG. 3, of an energy saving control process (print request accepting process) in which the busy signal BUSY is continuously outputs to the external device 22 from the time the power is turned on until the time the facsimile apparatus 1 is stabilized when the strobe signal STB and dummy print data is sent from the external device 22.

The facsimile apparatus 1 enters the energy saving mode so as to save consumption of power of the facsimile apparatus 1. In the energy saving mode, most parts of the facsimile apparatus 1 other than the energy saving control unit 13 are deactivated or turned off when the facsimile apparatus 1 is waiting for reception of data.

The system control unit 5 outputs the high-level switch signal SW to the multiplexer 20 of the energy saving control unit 13 when the facsimile apparatus 1 is in the regular operation mode. Then, the multiplexer 20 outputs the communication signal CS1 from the external device 22 to the printer interface 12 as the communication signal CS2. If there is the strobe signal STB which corresponds to a print request and the dummy print data are present, print data sent from the external device 22 is converted into image data by the system control unit 5 and the printer interface 12. The image data is transferred to the plotter control unit 10 so as to output the image data to recording paper by the plotter 11.

When the facsimile apparatus 1 enters the energy saving mode from the regular operation mode, the system control unit 5 switches the switch signal SW being output to the system control unit 13 to the low level. The multiplexer 20 outputs the communication signal CS1 input from the external device 22 to the data decoder/generator 21 as the communication signal CS3 when the switch signal SW is switched to the low level.

In the energy saving mode, the energy saving control unit 13 turns off the busy signal BUSY so as to announce that the facsimile apparatus 1 is in a ready state where the facsimile apparatus 1 can receive a command from the external device 22. It is assumed that a routine indicated by a flowchart shown in FIG. 3 is started in the above-mentioned ready state. When the operation shown in FIG. 3 is started, it is determined whether or not the strobe signal STB is turned on. If it is determined, in step S1, that the strobe signal STB is turned on and the dummy print data are sent from the external device 22, the routine proceeds to step S2. In step S2, the data decoder/generator 21 of the energy saving control unit 13 distinguishes the strobe signal which was turned on, and switches the busy signal BUSY to an on state. That is, the busy state of the facsimile apparatus 1 is announced to the external device 22. Then, in step S3, each part of the facsimile apparatus 1 is activated or turned on. That is, the energy saving control unit 13 outputs the wakeup signal WU to the system control unit 5 so that the system control unit 5 activates or turns on each part of the facsimile apparatus 1. It should be noted that when a print request is made to the facsimile apparatus 1 by the external device 22, the external device 22 first sends the dummy print data as the first print data so that the strobe signal STB corresponding to the dummy print data can be recognized as the print request.

Thereafter, it is determined, in step S4, whether or not the initialization of the facsimile apparatus 1 has been completed. If it is determined that the initialization has not been completed, the process of step S4 is repeated until the initialization is completed. If it is determined that the initialization of the facsimile apparatus 1 has been completed, the routine proceeds to step S5. In step S5, the busy signal BUSY is turned off. That is, the ready state of the facsimile apparatus 1 is announced to the external device 22 so as to receive true print data from the external device. Then, in step S6, the print data is sent from the external device to the printer interface 12 of the facsimile apparatus 1 so as to output the print data on the recording paper.

As mentioned above, the external device 22, which uses the plotter 11 of the facsimile apparatus 1 as a printer, is able to switch the facsimile apparatus to the regular operation mode even when the facsimile apparatus 1 is in the energy saving mode. Additionally, the external device 22 is able to recognize that the preparation for a printing operation of the facsimile apparatus 1 is completed by the busy signal BUSY sent from the facsimile apparatus 1. Thus, the external device can use the facsimile apparatus as a printer to print out the print data sent from the external device 22 even when the facsimile apparatus 1 is set in the energy saving mode without any inconvenient manual operation by an operator. As a result, the utility of the facsimile apparatus 1 is improved. Additionally, in the energy saving mode, since power is provided only to the energy saving control unit 13, and other parts are deactivated or turned off, the power consumption of the facsimile apparatus can be greatly reduced.

A description will now be given, with reference to FIG. 4, of the energy saving control process (print request accepting process) in which the data is continuously output to the external device 22 until the facsimile apparatus 1 is stabilized after the power is turned on so as to announce that the facsimile apparatus 1 is in the energy saving mode when the wakeup command is sent from the external device 22.

The system control unit 5 outputs the high-level switch signal SW to the multiplexer 20 of the energy saving control unit 13 when the facsimile apparatus 1 is in the regular operation mode. Then, the multiplexer 20 outputs the communication signal CS1 received from the external device 22 to the printer interface 12 as the communication signal CS2. If there is a strobe signal STB and wakeup command data which correspond to a print request, print data sent from the external device 22 is converted into image data by the system control unit 5 and the printer interface 12. The image data is transferred to the plotter control unit 10 so as to output the image data on recording paper by using the plotter 11.

When the facsimile apparatus 1 enters the energy saving mode from the regular operation mode, the system control unit 5 switches the switch signal SW being output to the system control unit 13 to the low level. The multiplexer 20 outputs the communication signal CS1 input from the external device 22 to the data decoder/generator 21 as the communication signal CS3 when the switch signal SW is switched to the low level.

In the energy saving mode, the energy saving control unit 13 turns off the busy signal BUSY so as to announce that the facsimile apparatus 1 is in a ready state where the facsimile apparatus 1 can receive a command from the external device 22. It is assumed that a routine indicated by a flowchart shown in FIG. 3 is started in the above-mentioned ready state. When the operation shown in FIG. 4 is started, it is determined, in step P1, whether or not the wakeup command is input from the external device 22. If it is determined that the wakeup command is input by the strobe signal and the wakeup command, the routine proceeds to step P2. In step P2, the data decoder/generator 21 of the energy saving control unit 13 recognizes the wakeup command, and outputs data to the external device 22 via the multiplexer 20 so as to announce that the facsimile apparatus 11 is in the energy saving mode. Then, in step P3, the energy saving control unit 13 controls the system control unit 5 to activate or turn on each part of the facsimile apparatus 1. That is, the energy saving control unit 13 outputs wakeup signal WU to the system control unit 5 so that the system control unit 5 activates or turns on each part of the facsimile apparatus 1.

Thereafter, it is determined, in step P4, whether or not the initialization of the facsimile apparatus 1 has been completed. If it is determined that the initialization is not completed, the routine proceeds to step P5. In step P5, it is determined whether or not the wakeup command is still input. If it is determined, in step P5, that the wakeup command is input, the routine proceeds to step P6. In step P6, the data is output indicating that the facsimile apparatus is still in the energy saving mode. Thereafter, the routine returns to step P4 so as to repeat the process of steps P4, PS and P6 until the determination of step P4 becomes affirmative.

The reason for the execution of step P5 is to announce to the external device 22 that the initialization of the facsimile apparatus 1 has not been completed yet. That is, if the wake up command is periodically sent from the external device 22, the facsimile apparatus 1 continuously responds to the wakeup command until the initialization of the facsimile apparatus 1 is completed.

If it is determined, in step P4, that the initialization of the facsimile apparatus 1 is completed, the routine proceeds to step P7. In step P7, the energy saving control unit 13 sends a ready command to the external device 22 to announce that preparation for receiving the print data is completed. Then, in step P8, the print data is sent from the external device 22 to the printer interface 12 of the facsimile apparatus 1 so as to output the print data on the recording paper.

As mentioned above, the external device 22, which uses the plotter 11 of the facsimile apparatus 1 as a printer, is able to switch the facsimile apparatus to the regular operation mode even when the facsimile apparatus 1 is in the energy saving mode. Additionally, the external device 22 is able to recognize that the preparation for a printing operation of the facsimile apparatus 1 is completed by the ready command sent from the facsimile apparatus 1. Thus, the external device 22 can use the facsimile apparatus as a printer to print out the print data sent from the external device 22 even when the facsimile apparatus 1 is set in the energy saving mode without any inconvenient operation by an operator. As a result, the utility of the facsimile apparatus 1 is improved. Additionally, in the energy saving mode, since power is provided only to the energy saving control unit 13, and other parts are deactivated or turned off, the power consumption of the facsimile apparatus can be greatly reduced. Further, since the printing operation based on the print data sent from the external device is started after the ready command is received by the external device 22, a reliable printing operation can be provided.

In the above-mentioned embodiment, the facsimile apparatus 1 is switched from the energy saving mode to the regular operation mode when the data decoder/generator 21 recognizes the wakeup command. However, the present invention is not limited to this method. For example, energy saving control unit 13 may recognize the strobe signal which is sent together with the wakeup command, and may send the ready command after the facsimile apparatus 1 is stabilized. According to this structure, the construction of the data decoder/generator 21 can be simplified, and the power used for recognizing the wakeup command can be eliminated when the facsimile apparatus 1 is in the energy saving mode. Thus, the power consumption of the facsimile apparatus 1 can be further reduced.

Additionally, although in the above-mentioned embodiment, the facsimile apparatus 1 is used as means for printing the image data sent from the external device 22, other image forming apparatuses such as a printer or a copy machine may be used to print the image data sent from the external device 22. Further, image data outputting apparatuses such as a copy machine or a scanner may be used for the external device 22 so as to send the image data to the image forming apparatus such as the facsimile apparatus 1.

The present invention is not limited to the specifically disclosed embodiments, and variations and modifications may be made without departing from the scope of the present invention.

What is claimed is:

1. An image forming system comprising:
   an image data outputting apparatus that outputs print data to be printed and a print request;
   a facsimile apparatus that outputs image data and a calling signal;
   an image forming apparatus that receives said print data and said image data and that prints said print data and said image data on a recording sheet, said image forming apparatus having an energy saving mode in which power consumption of said image forming apparatus is reduced when said image forming apparatus is waiting to receive said print data and said image data; and
   a plurality of communication lines that respectively connect said image data outputting apparatus and said facsimile apparatus to said image forming apparatus,
   wherein said image forming apparatus includes an energy saving control unit that recognizes said print request sent from said image data outputting apparatus via a communication line of said plurality of communication lines when said image forming apparatus is set in said energy saving mode so that said energy saving mode is cancelled when said print request is recognized, said energy saving control unit including a multiplexer unit that receives a communication signal including said print data from said image data outputting apparatus and based on whether said image forming apparatus is in said energy saving mode selectively sends said received communication signal to one of a data decoder/generator unit of said energy saving control unit and a printer interface unit.

2. The image forming system as claimed in claim 1, wherein each part of said image forming apparatus other than said energy saving control unit is deactivated when said image forming apparatus is set in said energy saving mode.

3. The image forming system as claimed in claim 1, wherein said image forming apparatus is activated when said energy saving control unit recognizes said print request, and said image forming apparatus announces to said image data outputting apparatus that said image forming apparatus is prepared to receive said print data when said image forming apparatus is set in a predetermined stable state after said image forming apparatus is activated.

4. An image forming system comprising:
   an image data outputting apparatus that outputs image data to be printed;
   an image forming apparatus that receives said image data and that prints said image data on a recording sheet, said image forming apparatus having an energy saving mode in which power consumption of said image forming apparatus is reduced when said image forming apparatus is waiting to receive said image data; and
   a communication line that connects said image data outputting apparatus to said image forming apparatus.
   wherein said image forming apparatus includes an energy saving control unit that recognizes a print request sent from said image data outputting apparatus via said communication line when said image forming apparatus is set in said energy saving mode so that said energy saving mode is cancelled when said print request is recognized, said energy saving control unit including a multiplexer unit that receives a communication signal from said image data outputting apparatus and based on whether said image forming apparatus is in said energy saving mode selectively sends said received communication signal to one of a data decoder/generator unit of said energy saving control unit and a printer interface unit, and
   wherein said image data outputting apparatus sends to said image forming apparatus a strobe signal and dummy print data prior to sending said image data, and said energy saving control unit recognizes said strobe signal as said print request and in response thereto cancels said energy saving mode.

5. The image forming system as claimed in claim 4, wherein each part of said image forming apparatus other than said energy saving control unit is deactivated when said image forming apparatus is set in said energy saving mode.

6. The image forming system as claimed in claim 4, wherein
   said image forming apparatus outputs a busy signal to said image data outputting apparatus when said energy saving control unit recognizes said print request, said busy signal indicating that said image forming apparatus is set in said energy saving mode, and
   said image forming apparatus is activated when said energy saving control unit recognizes said print request.

7. The image forming system as claimed in claim 6, wherein said image forming apparatus stops output of said busy signal when said image forming apparatus is set in a predetermined stable state after said image forming apparatus is activated.

8. An image forming system comprising:
   an image data outputting apparatus that outputs image data to be printed;
   an image forming apparatus that receives said image data and that prints said image data on a recording sheet, said image forming apparatus having an energy saving mode in which power consumption of said image forming apparatus is reduced when said image forming apparatus is waiting to receive said image data; and
   a bidirectional interface unit that connects said image data outputting apparatus to said image forming apparatus,
   wherein said image forming apparatus includes an energy saving control unit that recognizes a print request sent from said image data outputting apparatus via said bidirectional interface unit when said image forming apparatus is set in said energy saving mode so that said energy saving mode is cancelled when said print request is recognized, said energy saving control unit including a multiplexer unit that receives a communication signal from said image data outputting apparatus and based on whether said image forming apparatus is in said energy saving mode selectively sends said received communication signal to one of a data decoder/generator unit of said energy saving control unit and said bidirectional interface unit, and wherein said image data outputting apparatus sends a wakeup command to said image forming apparatus prior to sending said image data, and said energy saving control unit recognizes said wakeup command as said print request and in response thereto cancels said energy saving mode.

9. The image forming system as claimed in claim 8, wherein each part of said image forming apparatus other than said energy saving control unit is deactivated when said image forming apparatus is set in said energy saving mode.

10. The image forming system as claimed in claim 8, wherein said image forming apparatus is activated when said energy saving control unit recognizes said print request, and said image forming apparatus sends to said image data outputting unit a ready command that indicates that said image forming apparatus is prepared to receive said image data when said image forming apparatus is set in a predetermined stable state after said image forming apparatus is activated.

11. The image forming system as claimed in claim 10, wherein said image forming apparatus outputs data indicating that said image forming apparatus is set in said energy saving mode until said image forming apparatus is set in a predetermined stable state after said energy saving control unit recognizes said print request.

12. An image forming system comprising:

an image data outputting apparatus that outputs image data to be printed:

an image forming apparatus that receives said image data and that prints said image data on a recording sheet, said image forming apparatus having an energy saving mode in which power consumption of said image forming apparatus is reduced when said image forming apparatus is waiting to receive said image data; and a bidirectional interface unit connecting said image data outputting apparatus to said image forming apparatus, wherein said image forming apparatus includes an energy saving control unit that recognizes a print request sent from said image data outputting apparatus via said bidirectional interface unit when said image forming apparatus is set in said energy saving mode so that said energy saving mode is canceled when said print request is recognized, said energy saving control unit including a multiplexer unit that receives a communication signal from said image data outputting apparatus and based on whether said image forming apparatus is in said energy saving mode selectively sends said received communication signal to one of a data decoder/generator unit of said energy saving control unit and said bidirectional interface unit, and wherein said image data outputting apparatus sends a wakeup command to said image forming apparatus prior to sending said image data, and said energy saving control unit recognizes a strobe signal as said image data, said strobe signal being sent from said image data outputting apparatus together with said wakeup command, and wherein said image forming apparatus is activated when said energy saving control unit recognizes said wakeup command, and said image forming apparatus sends to said image data outputting unit a ready command which indicates that said image forming apparatus is prepared to receive said image data when said image forming apparatus is set in a predetermined stable state after said image forming apparatus is activated.

13. A facsimile/printer/copier apparatus comprising:

a first input for inputting print data to be printed and a print request;

a second input for inputting facsimile image data and a calling signal;

a printer unit for printing the print data and the facsimile image data; and an energy saving control unit for operating the apparatus in an energy saving mode in which power consumption is reduced when the apparatus is waiting to receive the print data and the facsimile image data, the energy saving control unit including a multiplexer unit that receives a communication signal including the print data and based on whether said image forming apparatus is in said energy saving mode selectively sends the received communication signal to one of a data decoder/generator unit of the energy saving control unit and to a printer interface unit, wherein the energy saving control unit recognizes a receipt of the print request when the apparatus is in the energy saving mode and cancels the energy saving mode when receipt of the print request is recognized.

* * * * *